United States Patent
Stauffer et al.

(10) Patent No.: US 12,507,216 B2
(45) Date of Patent: Dec. 23, 2025

(54) AVAILABILITY CHECKS FOR ALTERNATIVE RADIO ACCESS TECHNOLOGIES OR RESOURCES

(71) Applicant: Google LLC, Mountain View, CA (US)

(72) Inventors: Erik Stauffer, Sunnyvale, CA (US); Jibing Wang, San Jose, CA (US)

(73) Assignee: Google LLC, Mountain View, CA (US)

( * ) Notice: Subject to any disclaimer, the term of this patent is extended or adjusted under 35 U.S.C. 154(b) by 369 days.

(21) Appl. No.: 18/019,762

(22) PCT Filed: Aug. 4, 2021

(86) PCT No.: PCT/US2021/044475
§ 371 (c)(1),
(2) Date: Feb. 3, 2023

(87) PCT Pub. No.: WO2022/031802
PCT Pub. Date: Feb. 10, 2022

(65) Prior Publication Data
US 2023/0292370 A1  Sep. 14, 2023

Related U.S. Application Data

(60) Provisional application No. 63/061,615, filed on Aug. 5, 2020.

(51) Int. Cl.
*H04W 72/04* (2023.01)
*H04W 74/0833* (2024.01)
(Continued)

(52) U.S. Cl.
CPC ....... *H04W 72/04* (2013.01); *H04W 74/0833* (2013.01); *H04W 74/0836* (2024.01); *H04W 74/0838* (2024.01)

(58) Field of Classification Search
CPC ............. H04W 74/0833; H04W 72/04; H04W 74/0866; H04W 84/047; H04W 74/085;
(Continued)

(56) References Cited

U.S. PATENT DOCUMENTS

| 2007/0224988 A1 | 9/2007 | Shaheen |
| 2009/0239554 A1 | 9/2009 | Sammour et al. |

(Continued)

FOREIGN PATENT DOCUMENTS

| WO | 2017179784 A1 | 10/2017 |
| WO | 2020004773 A1 | 1/2020 |
| WO | 2020034978 A1 | 2/2020 |

OTHER PUBLICATIONS

WO 2020/164540 A1 (Year: 2020).*
(Continued)

*Primary Examiner* — Rushil P. Sampat
(74) *Attorney, Agent, or Firm* — Womble Bond Dickinson (US) LLC

(57) ABSTRACT

A method in a base station configured to communicate with a user device using a first radio access technology (RAT) and/or a first radio resource includes receiving a first random access message from the user device via first random access channel (RACH) resources, determining that the first random access message is requesting RAT and/or radio resource availability, and transmitting to the user device a second random access message indicating whether a second RAT and/or a second radio resource is available to the user device.

20 Claims, 7 Drawing Sheets

(51) Int. Cl.
H04W 74/0836 (2024.01)
H04W 74/0838 (2024.01)

(58) Field of Classification Search
CPC ... H04W 74/004; H04W 36/08; H04W 52/36; H04W 76/19; H04W 74/0836; H04B 7/155; H04B 7/0695
See application file for complete search history.

(56) References Cited

U.S. PATENT DOCUMENTS

| | | | |
|---|---|---|---|
| 2012/0307716 A1* | 12/2012 | Zhao | H04B 7/155 370/315 |
| 2013/0044657 A1 | 2/2013 | Oh et al. | |
| 2014/0106793 A1 | 4/2014 | Lee et al. | |
| 2014/0146792 A1 | 5/2014 | Andre-Jonsson et al. | |
| 2015/0103761 A1 | 4/2015 | Chen et al. | |
| 2015/0208286 A1 | 7/2015 | Ozturk et al. | |
| 2016/0029303 A1 | 1/2016 | Sahu et al. | |
| 2016/0095154 A1* | 3/2016 | Palm | H04W 48/18 370/329 |
| 2018/0249374 A1 | 8/2018 | Park et al. | |
| 2019/0045480 A1 | 2/2019 | Horn et al. | |
| 2019/0059089 A1 | 2/2019 | Marinier et al. | |
| 2019/0174421 A1 | 6/2019 | Quan et al. | |
| 2019/0327764 A1* | 10/2019 | Yoo | H04W 72/044 |
| 2020/0112908 A1 | 4/2020 | Li et al. | |
| 2020/0396667 A1* | 12/2020 | Kaasalainen | H04W 76/10 |
| 2022/0124813 A1* | 4/2022 | Cao | H04L 5/0044 |
| 2022/0167399 A1* | 5/2022 | He | H04B 7/06964 |
| 2022/0279575 A1* | 9/2022 | Lei | H04L 1/0061 |

OTHER PUBLICATIONS

The International Search Report and Written Opinion of the International Searching Authority for International Application No. PCT/US2021/044475 mailed Nov. 18, 2021.
LTE eNB—5G gNB Dual Connectivity (EN-DC), Feb. 20, 2019, EventStudio, https://www.EventHelix.com/EventStudio/.

* cited by examiner

AVAILABILITY CHECKS FOR ALTERNATIVE RADIO ACCESS TECHNOLOGIES OR RESOURCES

CROSS-REFERENCE TO RELATED APPLICATION

This application is a national phase entry of International Application No. PCT/US2021/044475 filed Aug. 4, 2021, which claims priority to U.S. Provisional Application No. 63/061,615, filed Aug. 5, 2020, the entire contents of each of which are hereby incorporated by reference.

FIELD OF THE DISCLOSURE

This disclosure relates generally to wireless communications and, more particularly, to procedures for providing information about, and/or facilitating access to, alternative radio access technologies and/or radio resources.

BACKGROUND

In some scenarios, a user equipment (UE) camped on a cell within a radio access network (RAN) of a first radio access technology (RAT) would benefit from quickly discovering whether another RAT is currently available. For example, an idle UE camped on a 4G cell may want to know whether a 5G RAN is available when the UE launches an application with requirements that 4G cannot satisfy (e.g., lower-latency and/or higher-throughput), or when data associated with such an application is ready for transmission. With conventional technologies, however, the UE can only learn this via a substantial amount of messaging and processing, and/or by transitioning out of a particular state (e.g., idle/inactive) with respect to the current RAT, both of which can result in significant delays. Similar problems can occur in other contexts, such as when a UE wishes to discover the availability of particular frequencies or channels supported by a neighbor base station implementing the same RAT as the serving base station.

SUMMARY

A UE of this disclosure, when in an idle or inactive state relative to a RAN of a particular RAT (e.g., when camped on a cell of a 4G or 5G base station), can use a random access channel (RACH) procedure to quickly and on-demand determine the availability of an alternative RAT, and/or the availability of an alternative radio resource (e.g., another frequency range supported by the same RAT or another RAT).

In some implementations, the RACH procedure is a contention-based RACH procedure, such as the four-step or two-step contention-based RACH procedure defined in the 3GPP specification for 4G LTE or 5G NR. For example, a UE desiring to know the availability of another RAT and/or radio resource may initiate a four-step or two-step RACH procedure by sending a Msg1 or MsgA, respectively, to a serving base station (e.g., the base station of a cell on which the UE is currently camped). In response, the base station can send a Msg2 or MsgB, respectively, that includes an extra field or fields (relative to the standards-defined RACH procedure) indicating the current availability of the other RAT and/or radio resource.

The RACH procedure that the UE initiates to determine the availability of the other RAT and/or radio resource may itself use resources that the current RAN designated for that specific purpose. For example, the serving base station may configure the UE with RACH resources (e.g., a preamble and/or physical random access channel (PRACH) occasion) that are dedicated for the purpose of determining availability of another RAT and/or radio resource, by specifying those RACH resources in a system information block (SIB). Alternatively, the base station may specify the RACH resources in an RRC message (e.g., an RRCRelease message that the base station sends to the UE when the UE is transitioning from a connected state to an idle state), or in another suitable manner.

When the base station detects a random access attempt by a UE (e.g., receives a Msg1 or MsgA) via these dedicated RACH resources, the base station responds by sending the UE a random access response ("RAR") message (e.g., a Msg2 or MsgB) that indicates whether the other RAT and/or radio resource is currently available. In some implementations, the base station determines the availability of the other RAT and/or radio resource based on whether an estimated location of the UE is within a known coverage area (e.g., cell boundaries) associated with the other RAT and/or radio resource. To this end, the base station may estimate a coarse UE location by calculating a distance based on the timing of the received signal containing the RACH message (e.g., Msg1 or MsgA) and/or by using antenna array processing to determine a direction from which the received signal arrived.

In some implementations and/or scenarios, the UE uses the dedicated RACH resources solely to determine availability of the other RAT and/or radio resource, without attempting to gain access to a channel of the current cell via the RACH procedure. That is, the UE may remain in an idle or inactive state regardless of channel availability on the current cell, and the RACH procedure may therefore be abbreviated. Accordingly, as used herein, the term "RACH procedure" can refer to a full RACH procedure (e.g., substantially as specified in a standard for the current RAT), or can refer to only a portion of such a procedure (e.g., only Msg1 and Msg2 of the four-step procedure, with no corresponding HARQ processing at the base station), and does not necessarily require that the procedure (or message, etc.) be used in an attempt to gain channel access.

In other implementations and/or scenarios, the UE uses a single instance of the RACH procedure not only to determine the availability of another RAT and/or radio resource, but also in a more conventional manner to attempt to access a channel of the current RAT. For example, the UE may desire to not only check availability of another RAT and/or radio resource, but also to change from an idle/inactive state to a connected state (e.g., in order to make a service request).

In some implementations, the serving base station designates specific sets of RACH resources (i.e., specific RACH configurations) for determining the availability of specific frequency ranges (e.g., bands or channels), which may be frequency ranges supported by the same RAT or another RAT. In one implementation, for example, the base station configures the UE to use a first set of RACH resources when checking the availability of sub-7 GHz channels on another RAT, and also configures the UE to use a different, second set of RACH resources when checking the availability of mmWave frequencies (e.g., 24 GHz or higher) on that same, other RAT.

In other implementations, the serving base station designates a single set of RACH resources (i.e., a single RACH configuration) for determining the availability of any of multiple other RATs and/or radio resources, and the UE indicates the specific RAT and/or radio resource of interest in the RACH message that the UE sends to the base station (e.g., Msg1 or MsgA). For example, the UE may indicate a specific RAT and a specific frequency range of interest in the PUSCH portion of a MsgA in a two-step RACH procedure, and the base station may respond by sending a MsgB that specifies the current availability of that RAT and frequency range.

In general, because the location of the UE can change over time, the serving base station dynamically determines the availability of the other RAT and/or radio resource. In some implementations, the base station also (or instead) determines availability based on one or more other time-varying factors (e.g., to account for the fact that the loading on neighbor base stations changes constantly). In some implementations where the UE seeks to learn the availability of a specific frequency range, for example, the base station determines availability of that frequency range based on both the current UE location and the current availability of the frequency range (e.g., as dictated by current traffic on the channel(s) of that frequency range). Moreover, in some implementations, the base station can indicate availability of the other RAT and/or radio resource in a non-binary manner. For example, the base station may use a MsgB of a two-step RACH procedure to indicate an "unavailable" status (e.g., if the UE is not located in an area where a desired RAT and/or radio resource is accessible), a "temporarily unavailable" status (e.g., if the UE is located in an area covered by the desired RAT and/or radio resource, but the capacity is full), or an "available" status (e.g., if the UE is located in a covered area and capacity is not full).

The availability check initiated by the UE may also serve to indicate to the base station that the UE prefers the other RAT and/or radio resource relative to the current RAT and/or radio resource, in which case the base station may facilitate a faster connection via the other RAT and/or radio resource. For example, if the UE uses the dedicated RACH procedure to change from the idle/inactive state to a connected state on the current RAT, the base station may schedule the UE to make signal or channel quality measurements for another RAT and/or frequency range of interest, thereby enabling the UE to more quickly connect via the other RAT and/or frequency range. As another example, if there are reasons for the UE to stay connected to the serving base station (e.g., if the UE has some data buffered at the base station), the base station may cause the UE to also connect to a RAN of another desired RAT, in a multi-RAT dual connectivity (MR-DC) scheme. As yet another example, the base station may initiate dual connectivity or carrier aggregation with another base station of the same RAT.

One example embodiment of these techniques is a method, in a base station configured to communicate with a user device using a first RAT and/or a first radio resource, that includes receiving a first random access message from the user device via first RACH resources, determining, by processing hardware of the base station, that the first random access message is requesting RAT and/or radio resource availability, and transmitting to the user device a second random access message indicating whether a second RAT and/or a second radio resource is available to the user device.

Another example embodiment of these techniques is a method, in a user device configured to communicate with a base station using a first RAT and/or a first radio resource, that includes transmitting a first random access message to the base station via first RACH resources, receiving a second random access message from the base station in response to the first random access message, and determining, by processing hardware of the user device, whether a second RAT and/or a second radio resource is available based on the second random access message.

DETAILED DESCRIPTION OF THE DRAWINGS

Figure 1:
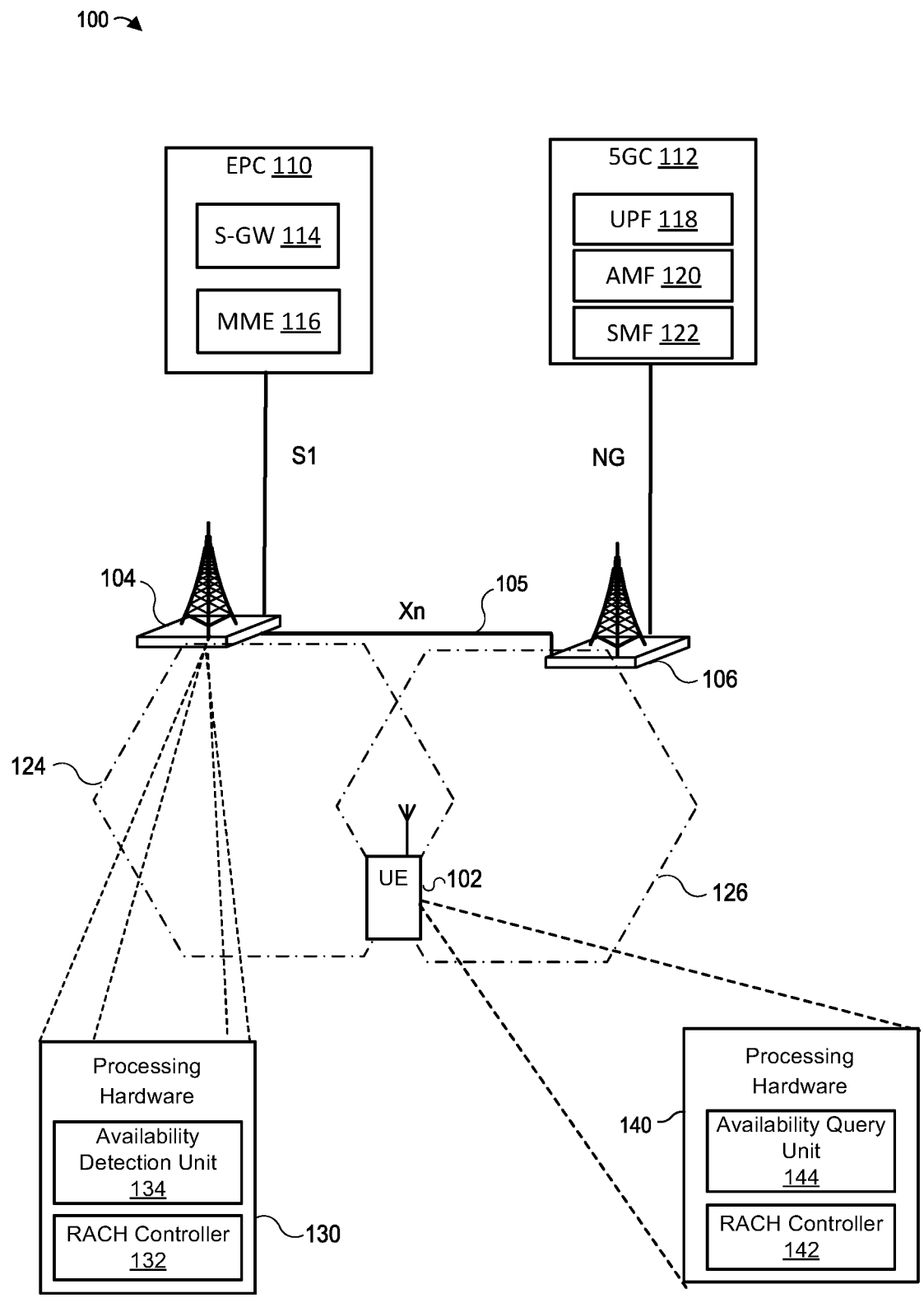
FIG. 1 illustrates an example, multi-RAT wireless communication system in which UEs and base stations can implement the techniques of this disclosure for checking the availability of alternative RATs and/or radio resources.

FIG. 1 depicts an example, multi-RAT wireless communication system 100 in which a UE 102 is configured to communicate with a base station 104 and a base station 106 at different times or (in some scenarios and implementations that support multi-RAT dual connectivity) simultaneously. The UE 102 can be any suitable device capable of wireless communication with base stations 104, 106 (e.g., any of the exemplary user devices discussed below after the description of the figures). In this example, the base station 104 supports the EUTRA radio access technology (RAT) and is connected to an evolved packet core (EPC) 110, while the base station 106 supports the 5G New Radio (NR) RAT and is connected to a 5G core (5GC) 112. The base station 104 may be an eNB supporting an S1 interface for communicating with the EPC 110, and the base station 106 may be a gNB supporting an NG interface for communicating with the 5GC 112. In other implementations and/or scenarios, the base station 104 and/or 106 can instead (or also) operate according to RATs of other types, and/or the base stations 104 and/or 106 can instead (or also) be connected to CNs of other types. For example, the base station 104 may operate as an ng-eNB and/or base station 106 may operate as an en-gNB. In some implementations, the base stations 104 and 106 implement the same RAT but support different frequency bands, or even the same frequency bands. To directly exchange messages with each other during the various implementations and scenarios discussed below, the base stations 104 and 106 support an interface 105, which may be an Xn interface (as shown in FIG. 1) or another suitable type of interface (e.g., an X2 interface).

Among other components, the EPC 110 can include a Serving Gateway (S-GW) 114 and a Mobility Management Entity (MME) 116. The S-GW 114 is generally configured to transfer user-plane packets related to audio calls, video calls, Internet traffic, etc., and the MME 116 is generally configured to manage authentication, registration, paging, and other related functions. The 5GC 112 includes a User Plane Function (UPF) 118 and an Access and Mobility Management Function (AMF) 120, and/or a Session Management Function (SMF) 122. The UPF 118 is generally configured to transfer user-plane packets related to audio calls, video calls, Internet traffic, etc., the AMF 120 is generally configured to manage authentication, registration, paging, and other related functions, and the SMF 122 is generally configured to manage PDU sessions.

Generally, the wireless communication system 100 may include any suitable number of base stations supporting NR cells or EUTRA cells. More particularly, the EPC 110 or the 5GC 112 can be connected to any suitable number of base stations supporting NR cells and/or EUTRA cells. Although most examples below refer specifically to specific CN types EPC and 5GC, and the specific RAT types EUTRA and 5G NR, in general the techniques of this disclosure can also apply to other suitable radio access and/or core network technologies, such as sixth generation (6G) radio access and/or 6G core network or 5G NR-6G DC, for example. Moreover, in some implementations, the wireless communication system 100 may include cells (or other types of coverage areas) of other types of RATs, with the associated network nodes. For example, the wireless communication system 100 may include, in addition to at least the base station 104, one or more access points (APs) of one or more wireless local area networks (WLANs).

In the example implementation of FIG. 1, the base station 104 covers an EUTRA cell 124 and the base station 106 covers a 5G NR cell 126. In the cell 124, the UE 102 uses a RACH procedure to gain access to an uplink channel for communicating with the base station 104. The UE 102 and the base station 104 can support one or more types of RACH procedures. In one implementation, for example, the UE 102 and the base station 104 support only a contention-based four-step RACH procedure. In another example implementation (e.g., if the base station 104 instead supports a 5G NR RAT), the UE 102 and the base station 104 may support a contention-based four-step RACH procedure, a contention-based two-step RACH procedure, and a "fallback" procedure for changing from a two-step to a four-step RACH procedure. In the cell 124, other UEs (not shown in FIG. 1) can also operate and, at times, attempt to gain access to the same uplink channel (e.g., the same time-frequency resource for uplink transmissions) as the UE 102. The other UEs may be similar to the UE 102, or may be other types of devices that are similarly able to communicate with the base station 104 via the cell 124 using the same RACH procedure(s) as UE 102.

As illustrated in FIG. 1, the base station 104 is equipped with processing hardware 130, which can include one or more general-purpose processors (e.g., central processing units (CPUs)) and non-transitory computer-readable memory storing machine-readable instructions that are executable on the one or more general-purpose processors, and/or special-purpose processing units. The processing hardware 130 includes a RACH controller 132, which generally supports one or more RACH procedures for the base station 104 (e.g., as described above). The RACH controller 132 can configure the UE 102 with a set of available time-frequency resources, from which the UE 102 can select a specific time-frequency resource to transmit a first message of the RACH procedure (e.g., a MsgA or Msg1). The set of time-frequency resources may be a set of preambles each associated with a different PRACH occasion, for example, where any UE (e.g., UE 102) using a particular PRACH occasion for a RACH procedure includes the corresponding preamble in the first RACH message (e.g., a MsgA or Msg1). In one such implementation, the RACH controller 132 can also associate each preamble/PRACH occasion to a different PUSCH occasion (i.e., time-frequency resource for uplink data transmission), or possibly to a different set of multiple PUSCH occasions, and a UE (e.g., UE 102) using a particular preamble and PRACH occasion uses the corresponding PUSCH occasion, or one occasion from the corresponding set of PUSCH occasions, to transmit or re-transmit data (e.g., in a MsgA or Msg3).

In some implementations, the RACH controller 132 can also configure UEs with time-frequency resources that are dedicated for purposes other than, or in addition to, channel access. In particular, and as discussed in further detail below, the RACH controller 132 can configure the UE 102 with a particular set of RACH resources (i.e., a particular RACH configuration) that is dedicated for checking the current availability of an alternative RAT and/or radio resource (e.g., frequency band, channel, time slot, etc.), or can configure the UE 102 with multiple RACH configurations each dedicated for checking the availability of a different RAT and/or radio resource (e.g., a first RACH configuration for checking availability of a first frequency band, a second RACH configuration for checking availability of a second frequency band, etc.).

The processing hardware 130 also includes an availability detection unit 134, which generally determines the current availability of another RAT and/or radio resource based on one or more factors (e.g., the current location of a UE relative to another cell, current capacity of the other cell, etc.). The availability detection unit 134 may be implemented by the RACH controller 132, and/or by another controller of the processing hardware 130.

The base station 106 is equipped with processing hardware that may be similar to the processing hardware 130, but may differ in some respects (e.g., in accordance with the differences between EUTRA and 5G NR, and possibly by excluding an availability detection unit, etc.).

The UE 102 is equipped with processing hardware 140, which can include one or more general-purpose processors (e.g., CPUs) and non-transitory computer-readable memory storing machine-readable instructions that are executable on the one or more general-purpose processors, and/or special-purpose processing units. The processing hardware 140 includes a RACH controller 142 and an availability query unit 144. The RACH controller 142 generally supports one or more RACH procedures for the UE 102. For example, the RACH controller 142 may support both two-step and contention-based four-step RACH procedures, as well as a procedure for "falling back" from a two-step to a four-step procedure as defined in the 3GPP 5G NR specification.

The availability query unit 144 may be implemented by the RACH controller 142, and/or by another controller of the UE 102 (e.g., a MAC or RRC controller). In general, when the UE 102 is camped on the cell of a base station and the UE 102 determines that a particular RAT and/or radio resource is needed (or preferred or otherwise desired), the availability query unit 144 triggers the RACH controller 142 to query the serving base station (e.g., base station 104) regarding the availability of that RAT and/or radio resource. To make this determination, the availability query unit 144 may be in communication with one or more application layers residing above the layer(s) at which the availability query unit 144 is implemented (e.g., residing above the MAC, RRC and/or other layers). The availability query unit 144 may then cause the RACH controller 142 to initiate a RACH procedure using a RACH configuration (i.e., a specific set of RACH resources, such as a preamble and PRACH occasion) that is dedicated/reserved for availability checks. In some implementations and/or scenarios, the availability query unit 144 only triggers the RACH procedure after determining that one or more other criteria are satisfied, in addition to determining that a particular RAT and/or radio resource is desired (e.g., only if no higher-priority data or higher-priority application requires or prefers another RAT and/or radio resource, etc.).

Figure 2:
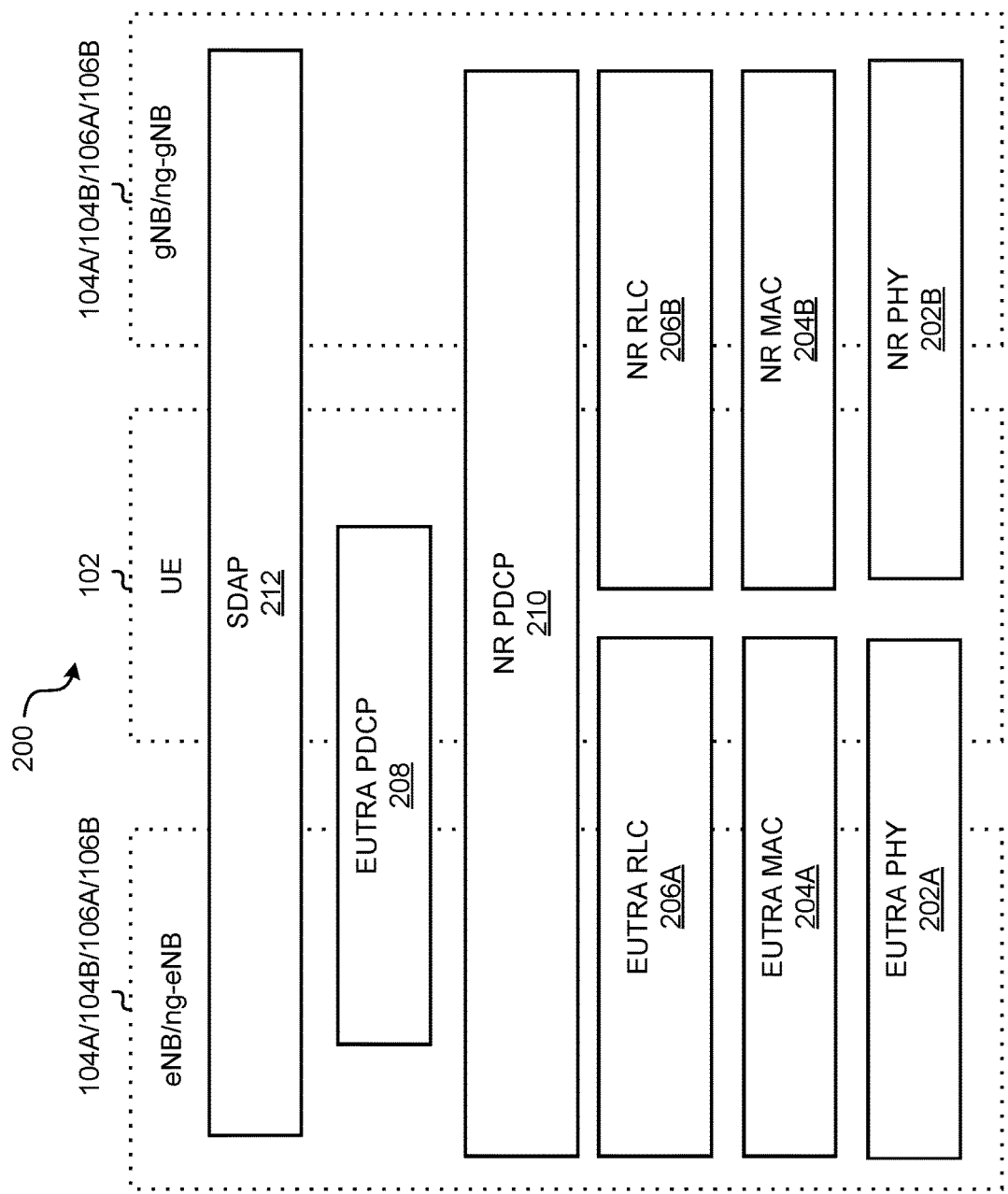
FIG. 2 is a block diagram of an example protocol stack according to which the UE of FIG. 1 communicates with one or more of the base stations of FIG. 1.

FIG. 2 illustrates, in a simplified manner, an example radio protocol stack 200 according to which the UE 102 may communicate with an eNB or ng-eNB (e.g., base station 104), or a gNB or en-gNB (e.g., base station 106). In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels to the NR PDCP sublayer 210. The UE 102, in the example implementation of FIG. 1, supports both the EUTRA and the NR stack as shown in FIG. 2, to support handover between EUTRA and NR base stations and/or to support multi-RAT DC (MR-DC) over EUTRA and NR interfaces. Further, as illustrated in FIG. 2, the UE 102 may support layering of the NR PDCP sublayer 210 over the EUTRA RLC sublayer 206A.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Where the difference between SDUs and PDUs is not relevant, both SDUs and PDUs can be referred to simply as "packets."

On a control plane, the EUTRA PDCP sublayer 208 and the NR PDCP sublayer 210 can provide SRBs to exchange RRC messages, for example. On a user plane, the EUTRA PDCP sublayer 208 and the NR PDCP sublayer 210 can provide DRBs to support data exchange.

Figure 3:
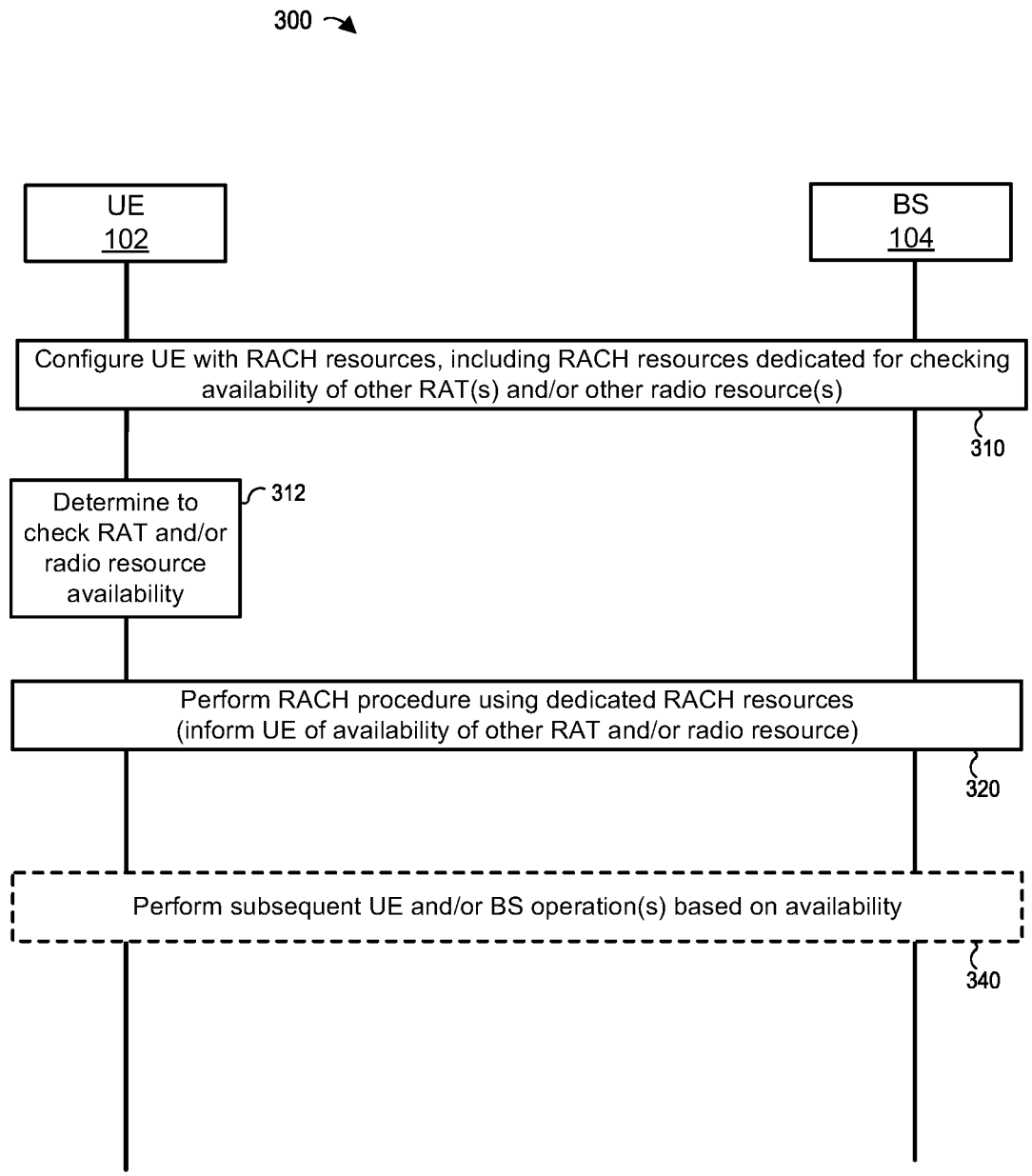
FIG. 3 is a messaging diagram of an example scenario in which a base station configures a UE to check, and the UE then does check, the availability of an alternative RAT and/or radio resource.

Next, various techniques that the UE 102 and the base station 104 can implement, with the UE 102 requesting that the base station 104 provide information regarding the availability of at least one other RAT and/or radio resource, are discussed with reference to FIGS. 3-5. In particular, FIG. 3 depicts a generalized implementation, while FIGS. 4 and 5 correspond to alternative ways to implement a specific portion of the technique shown in FIG. 3. While FIGS. 3-5 and the accompanying descriptions refer specifically to the UE 102 and the base station 104 (and sometimes base station 106) of FIG. 1, it is understood that the following techniques may be implemented by other user devices and/or base stations, and/or in systems other than the wireless communication system 100 of FIG. 1 (e.g., in a system including a base station and a WLAN, etc.).

Referring first to FIG. 3, in an example scenario 300, the base station 104 configures 310 the UE 102 with RACH information. The RACH information includes one or more sets of RACH resources (e.g., preambles, PRACH occasions, and PUSCH occasions), with each RACH resource set also being referred to herein as a "RACH configuration." The configuring 310 may also include the base station 104 configuring 310 the UE 102 with the associations between the various preambles, PRACH occasions, and PUSCH occasions. In some implementations, for example, the base station 104 associates each preamble with a different PRACH occasion, and associates each preamble/PRACH occasion pair with a different PUSCH occasion. In some implementations and/or scenarios, the preambles, PRACH occasions, and PUSCH occasions with which the base station 104 configures 310 the UE 102 may be the full set of available preambles and occasions that the UE 102 can select from and use when attempting to gain access to the base station 104 via the cell 124. Because the base station 104 informs the UE 102 of the associations, the UE 102 need only select a PRACH occasion or a preamble to effectively select the corresponding PUSCH occasion (or corresponding subset of PUSCH occasions, if more than one PUSCH occasion is associated to each preamble/PRACH occasion pair).

At least one of the sets of RACH resources (i.e., at least one RACH configuration) with which the base station 104 configures 310 the UE 102 is specifically dedicated for enabling the UE 102 to check the availability of another RAT and/or radio resource (e.g., frequency band, time slot, etc.). As discussed in further detail below, a single RACH configuration may be dedicated for checking the availability of a specific RAT and/or radio resource associated with that RACH configuration, or may instead be dedicated for checking the availability of any particular RAT and/or radio resource that is specified by the UE 102. Moreover, in some implementations, the UE 102 may use these dedicated RACH configurations not only to check RAT and/or radio resource availability, but also (if desired by the UE 102) to access a channel (e.g., to transition to a connected state and/or transmit uplink data). In other implementations, these dedicated RACH configurations cannot be used to access a channel, and can only be used by the UE 102 to check RAT and/or radio resource availability.

The configuring 310 may occur by way of the base station 104 sending one or more messages to the UE 102. For example, the base station 104 may specify the RACH configuration(s) in a system information block (SIB) that the base station 104 broadcasts on the cell 124 (e.g., a SIB1). Alternatively, the base station 104 may specify the RACH configuration(s) in an RRC message, such as an RRCRelease message that the base station 104 sends to the UE 102 when the UE 102 is transitioning from a connected state to an idle state. In still other implementations and/or scenarios, the base station 104 specifies the RACH configuration(s) in another suitable type of message or messages (e.g., in a master information block (MIB), in an RRCReconfiguration message that the base station 104 sends to the UE 102 in an RRC reconfiguration procedure as defined in 3GPP TS 38.331 section 5.3.5, in an RRCSetup message that the base station 104 sends to the UE 102 in an RRC connection establishment procedure as defined in 3GPP TS 38.331 section 5.3.3, in an RRCReestablishment message that the base station 104 sends to the UE 102 in an RRC reestablishment procedure as defined in 3GPP TS 38.331 section 5.3.7, in an RRCResume or RRCSetup message that the base station 104 sends to the UE 102 in an RRC connection resume procedure as defined in 3GPP TS 38.331 section 5.3.13, etc.).

At some point after the base station 104 configures 310 the UE 102, the UE 102 determines 312 to check the availability of another RAT (e.g., 5G NR) and/or radio resource (e.g., mmWave, or sub-7 GHz, etc.) supported by the neighboring base station 106. In various implementations and/or scenarios, the UE 102 determines 312 to check the availability of a different kind of RAT (e.g., a "WiFi" WLAN implementing an IEEE 802.11 protocol, not shown in FIG. 1), and/or the availability of a radio resource associated with a different kind of RAT (e.g., a WiFi band or channel). For ease of explanation, however, FIG. 3 (as well as FIGS. 4 and 5) is described with reference to an implementation and scenario in which the UE 102 checks the availability of a RAT supported by the base station 106 and cell 126, and/or the availability of a radio resource (e.g., frequency) supported by the base station 106 and cell 126.

The UE 102 may determine 312 to check the availability on demand (e.g., without being commanded by the base station 104), either in response to the UE 102 determining that a particular application has launched, in response to the UE 102 determining that a particular application has data ready for uplink transmission, or in response to some other event. For example, an application layer implemented at the UE 102 (e.g., a layer above the layers shown in the stack 200 of FIG. 2) may send an inter-protocol layer (IPL) message indicating an application launch (or indicating that new data from the application is ready for transmission, etc.) to a layer implemented by the availability query unit 144 of FIG. 1 (e.g., to the MAC layer 204A, to an RRC layer, and/or to another layer). The determining 312 may also include applying various other criteria (e.g., determining that no other, higher-priority data or application requires or prefers another RAT and/or radio resource, etc.). In some implementations, the determining 312 occurs while the UE 102 is in an idle or inactive state and camped on the cell 124. In other implementations, the determining 312 can occur regardless of whether the UE 102 is in a connected or idle/inactive state.

Thereafter, the UE 102 and the base station 104 perform 320 a RACH procedure using a specific set of RACH resources (RACH configuration) dedicated for checking the availability of the other RAT and/or radio resource of interest (in this example, the RAT and/or radio resource supported by base station 106 and cell 126). The UE 102 initiates this RACH procedure in response to the determination 312, and by transmitting a first random access message to the base station 104. The base station 104 responds by providing information regarding the availability of the other RAT and/or radio resource in a second random access message of the RACH procedure. Example implementations that use different types of RACH procedures, and/or include different content in the random access messages, are discussed below with reference to FIGS. 4 and 5. Depending on the implementation and/or scenario, performing 320 the RACH procedure may or may not include the UE 102 attempting to gain (and/or actually gaining) access to a channel supported by the base station 104 and cell 124.

After the UE 102 and base station 104 perform 320 the RACH procedure using the dedicated RACH resources, the UE 102 has learned the availability of the other RAT and/or radio resource, and the base station 104 has learned that the UE 102 is interested in that RAT and/or radio station. Based on this knowledge, the UE 102 and/or the base station 104 may optionally perform 340 one or more subsequent operations. If the UE 102 requested the availability of a 5G NR RAN that is supported by base station 106 and cell 126, for example, and if the base station 104 informed the UE 102 that such a RAN was currently available, the UE 102 may in response attempt to communicate with the base station 106 via the cell 126. As another example, if the UE 102 requested the availability of a WLAN, and if the base station 104 informed the UE 102 that such a WLAN was currently available, the UE 102 may in response begin to communicate with an AP of that WLAN.

In some implementations and scenarios where performing 320 the RACH procedure results in the UE 102 accessing a channel on the cell 124, the base station 104 uses the knowledge that the UE 102 is interested in the other RAT and/or radio resource in order to configure the UE 102 in a particular way (e.g., to facilitate a faster connection with base station 106 via cell 126). For example, the base station 104 may schedule the UE 102 to make signal and/or channel quality measurements for cell 126 (possibly on a specific frequency of interest), thereby enabling the UE 102 to more quickly connect to the base station 106 via cell 126 than would otherwise be possible. In one such implementation, if there are reasons for the UE 102 to stay connected to the base station 104 (e.g., if the UE 102 has some data buffered at the base station 104), the base station 104 may cause the UE 102 to simultaneously communicate with base stations 104 and 106, in an MR-DC scheme. As yet another example, if the base stations 104 and 106 both support the same RAT (e.g., 5G NR), and if the UE 102 requested the availability of another frequency supported by the same RAT, then base station 104 may initiate carrier aggregation with a first frequency supported by base station 104 and a second, different frequency supported by base station 106.

If the UE 102 instead learns at event 320 that the other RAT and/or radio resource is not currently available, then the UE 102 and/or base station 104 may instead perform 340 a different procedure or procedures. If the RACH procedure of event 320 did not result in channel access/connectivity, for example, and if the other RAT and/or radio resource is not currently available, then event 340 may include performing a subsequent, conventional RACH procedure with base station 104 via cell 124, in an attempt to gain access to a channel on cell 124. In other scenarios, the UE 102 may take no responsive action after learning the availability of the other RAT and/or radio resource. For example, if the UE 102 learns at event 320 that the other RAT and/or radio resource is not currently available, then event 340 may be omitted entirely.

Figure 4:
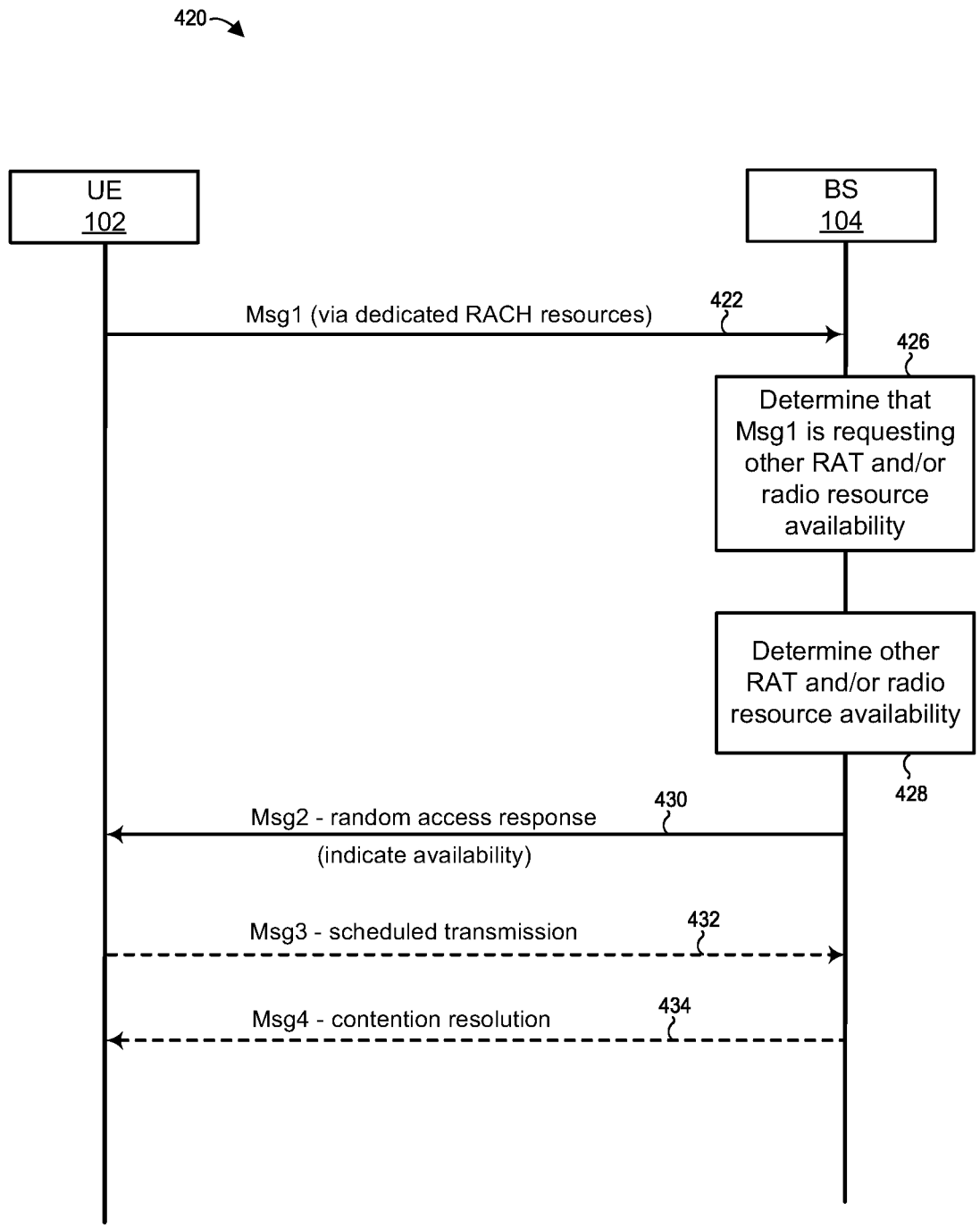
FIG. 4 is a messaging diagram of an example procedure in which a UE uses a four-step, contention-based RACH procedure to check the availability of an alternative RAT and/or radio resource.
Figure 5:
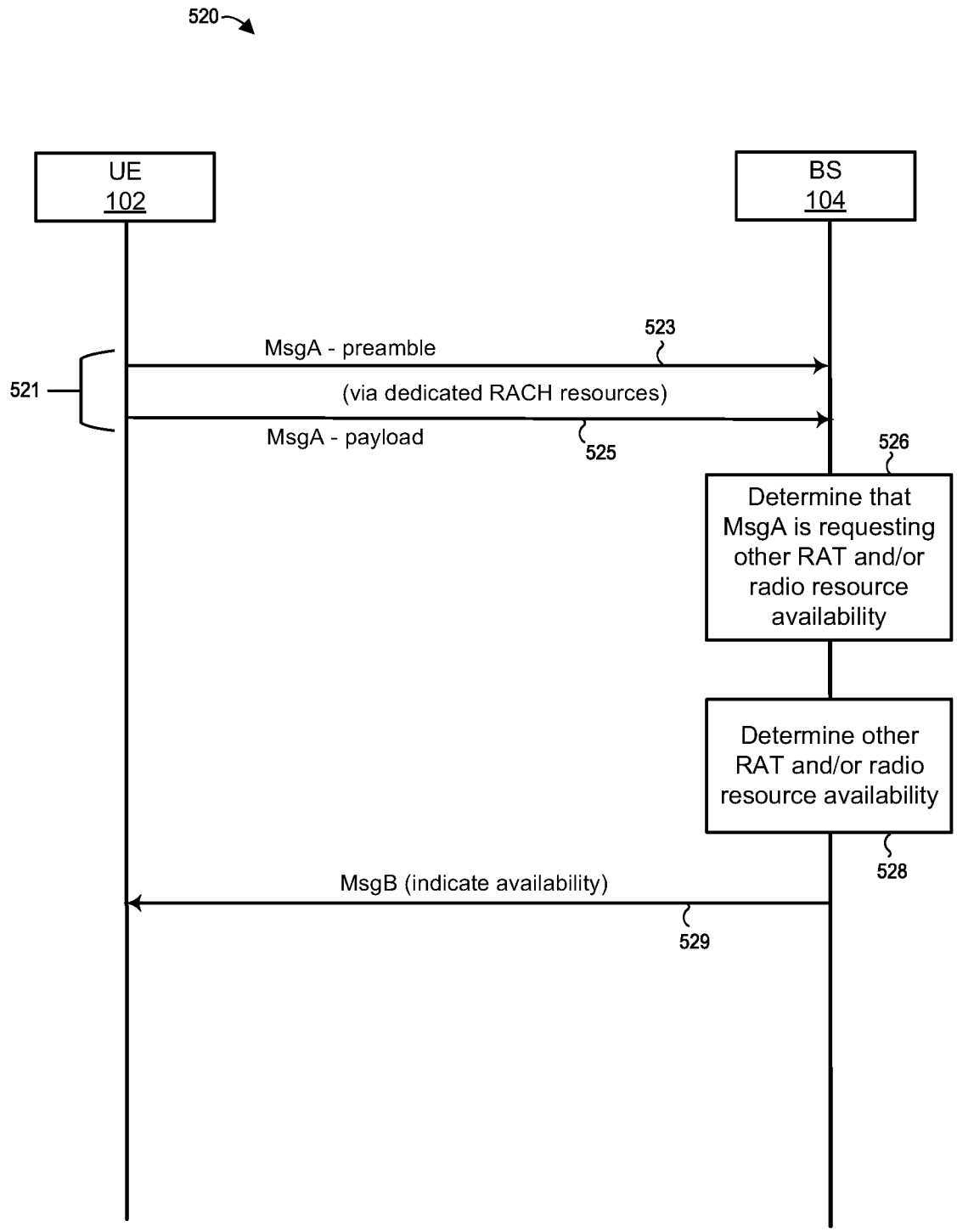
FIG. 5 is a messaging diagram of an example procedure in which a UE uses a two-step, contention-based RACH procedure to check the availability of an alternative RAT and/or radio resource.

FIGS. 4 and 5 show two alternative implementations for event 320 of FIG. 3. Specifically, FIG. 4 corresponds to an implementation in which event 320 is performed using a four-step, contention-based RACH procedure (labeled in FIG. 4 as event 420), and FIG. 5 corresponds to an implementation in which event 320 is performed using a two-step, contention-based RACH procedure (labeled in FIG. 5 as event 520). In other implementations, however, the UE 102 and base station 104 may use a different type of RACH procedure at event 320.

Referring first to event 420 of FIG. 4, the UE 102 initiates a four-step, contention based RACH procedure by transmitting 422 a Msg1 to the base station 104. As in a conventional RACH procedure (e.g., as specified in the 3GPP LTE or NR specification), the Msg1 includes a preamble sequence and is transmitted via a PRACH occasion. In this implementation, however, the preamble and/or PRACH occasion is/are specifically associated with (i.e., dedicated for) an alternative RAT and/or radio resource availability check. That is, the preamble and/or PRACH occasion is/are resources that the base station 104, at event 310, had included in a RACH configuration dedicated for such availability checks.

In some implementations, the UE 102 chooses the set of RACH resources for Msg1 from among multiple sets of RACH resources, where each set is dedicated for checking the availability of a different RAT and/or a different radio resource. For example, the base station 104 may have configured 310 the UE 102 with a first RACH configuration dedicated for checking the availability of a sub-7 GHz band on a particular RAT, and configured 310 the UE 102 with a second RACH configuration dedicated for checking the availability of a mmWave band on that same RAT (or on another RAT). In the example of FIG. 4, the Msg1 itself may omit any information (e.g., information elements or fields) specifying the RAT and/or radio resource for which the UE 102 is checking availability.

After (or while) receiving the Msg1 at event 422, the base station 104 determines 426 that the Msg1 (and thus the UE 102) is requesting the availability of another RAT and/or radio resource. More specifically, in some implementations, the base station 104 determines 426 that the Msg1 is requesting the availability of the RAT and/or radio resource associated with the particular RACH resources (e.g., preamble and/or PRACH occasion) that the UE 102 had used to generate and transmit 422 the Msg1. The base station 104 may make this determination 426, for example, by determining the preamble and/or PRACH occasion used by the UE 102 to transmit 422 the Msg1, and then comparing that preamble and/or PRACH occasion to locally stored data indicating associations between (1) preambles and/or PRACH occasions, and (2) RATs and/or radio resources.

Having identified Msg1 as a request for availability of a certain RAT and/or radio resource, the base station 104 proceeds to determine 428 whether that RAT and/or radio resource is currently available. In some implementations, the base station 104 determines 428 availability dynamically, based at least in part on the current location of the UE 102 relative to the coverage area of the other RAT and/or radio resource (in this example, as defined by the boundaries of the neighboring cell 126). The base station 104 may estimate the current location of the UE 102, at least coarsely, by (1) calculating a distance between the base station 104 and UE 102 based on the timing (e.g., propagation time, or a time offset relative to an expected time, etc.) of the received signal containing the Msg1, (2) using antenna array processing to estimate a direction from which the received signal arrived, and then (3) offsetting the known location of the base station 104 by the estimated distance and in the estimated direction. The base station 104 can then determine whether the estimated location of the UE 102 falls within the known coverage area of cell 126.

In some implementations, the base station also (or instead) determines availability of the other RAT and/or radio resource based on one or more other time-varying factors. If the UE 102 transmits 422 Msg1 in order to learn the current availability of a particular frequency (e.g., channel or set of channels), for example, the base station 104 may determine 428 the availability based on both the estimated location of the UE 102 and the current load or traffic on the specific channel(s) of that frequency. As another example, if the UE 102 transmits 422 Msg1 in order to learn the current availability of a particular RAT, the base station 104 may determine 428 the availability based on both the estimated location of the UE 102 and the current load or traffic across all channels supported by that RAT. The base station 104 may determine 428 availability of the other RAT and/or frequency by communicating with the base station 106 that supports the other RAT and/or frequency, via an interface (e.g., by receiving network load/capacity information from the base station 106 via the Xn interface 105). In other implementations and/or scenarios where the other RAT is not a cellular technology (e.g., WLAN or satellite), or where the other radio resource is supported by a non-cellular RAT, the base station 104 may determine availability by communicating with a node of the other network type via a network interworking protocol.

After determining 428 availability of the other RAT and/or radio resource, the base station 104 transmits 430 a Msg2 (random access response, or "RAR") to the UE 102. The Msg2 may be similar to the Msg2 of a conventional four-step, contention-based RACH procedure, but is modified to include an indication of the availability as determined 428 by the base station 104. For example, the Msg2 may include an additional field (e.g., a single bit) that indicates availability of the RAT and/or radio resource.

Moreover, in some implementations, the Msg2 can indicate availability of the other RAT and/or radio resource in a non-binary manner. For example, the base station 104 may use an extra field of the Msg2 to indicate an "unavailable" status (e.g., if the base station 104 determines 428 that the UE 102 is not located in cell 126), a "temporarily unavailable" status (e.g., if the base station 104 determines 428 that the UE 102 is located in cell 126 but the load on cell 126 is currently high), or an "available" status (e.g., if the base station 104 determines 428 that the UE 102 is located in cell 126 and the load is currently moderate or low).

As noted above, the RACH procedure that the UE 102 initiates to check RAT and/or radio resource availability may or may not be a full RACH procedure (i.e., may or may not have the potential to result in channel access and/or transition the UE 102 to a connected state). In implementations where the UE 102 does not use the RACH procedure to make a channel access attempt, the base station 104 may not perform any HARQ procedure, and/or event 420 may end after the base station 104 transmits 430 the Msg2 (or after the UE 102 processes the Msg2 to determine the RAT and/or radio access availability). In other implementations and/or scenarios, however, in response to receiving the Msg2 at event 430, the UE 102 transmits 432 a Msg3 containing a scheduled transmission to the base station 104. In response to the Msg3, the base station 104 transmits 434 a Msg4 to indicate contention resolution to the UE 102.

Referring next to event 520 of FIG. 5 (i.e., an alternative implementation of event 320 in FIG. 3), the UE 102 initiates a two-step, contention based RACH procedure by transmitting 521 a MsgA to the base station 104. As in a conventional two-step RACH procedure (e.g., as specified in the 3GPP 5G NR specification), the MsgA includes two parts sent on different occasions: a preamble sequence that is transmitted 523 via a PRACH occasion (e.g., similar to Msg1 of FIG. 4), and a payload that is transmitted 525 via a PUSCH occasion (e.g., similar to Msg3 of FIG. 4). In this implementation, however, the preamble and/or PRACH occasion is/are specifically associated with (i.e., dedicated for) alternative RAT and/or radio resource availability checks. Alternatively, or in addition, the PUSCH occasion for the MsgA payload may be specifically associated with such availability checks. That is, the preamble and/or PRACH occasion (and possibly the PUSCH occasion for the MsgA payload) is/are resources that the base station 104, at event 310, had included in a RACH configuration dedicated for such availability checks.

In some implementations, the UE 102 chooses the set of RACH resources for the MsgA from among multiple sets of RACH resources, where each set is dedicated for checking the availability of a different RAT and/or a radio resource. For example, the base station 104 may have configured 310 the UE 102 with a first RACH configuration dedicated for checking the availability of a sub-7 GHz band on a particular RAT, and configured 310 the UE 102 with a second RACH configuration dedicated for checking the availability of a mmWave band on that same RAT (or on another RAT). In the example of FIG. 5, the MsgA itself may omit any information (e.g., information elements or fields) specifying the RAT and/or radio resource for which the UE 102 is checking availability.

In other implementations, the base station 104 only configures 310 the UE 102 with a single RACH configuration for availability checks, and the UE 102 uses the contents of the MsgA to indicate the specific RAT and/or radio resource for which the UE 102 wishes to check availability. For example, the UE 102 may include a field or information element in the MsgA payload, indicating the RAT and/or radio resource of interest.

After (or while) receiving the MsgA at event 521, the base station 104 determines 526 that the MsgA (and thus the UE 102) is requesting the availability of another RAT and/or radio resource. In implementations where the base station 104 configured 310 the UE 102 with a different RACH configuration for each RAT and/or radio resource, the base station 104 may determine 526 the precise RAT and/or radio resource by determining the preamble and/or PRACH occasion (and/or PUSCH occasion) of the MsgA, and then comparing that preamble and/or PRACH occasion (and/or PUSCH occasion) to locally stored data indicating associations between (1) preambles and/or PRACH occasions, and (2) RATs and/or radio resources.

However, in implementations where the base station 104 had configured 310 the UE 102 with a single RACH configuration to handle availability checks for any of multiple different RATs and/or radio resources, the base station 104 may determine 526 the precise RAT and/or radio resource of interest (e.g., mmWave on 5G, etc.) by (1) first determining the RACH resources used to transmit 521 the MsgA (e.g., preamble, PRACH occasion, and/or PUSCH occasion), and then (2) in response to determining that those RACH resources are generally dedicated for availability checks, inspecting the MsgA payload to determine that the relevant field or information element indicates the specific RAT and/or radio resource of interest.

Having identified the MsgA as a request for availability of a particular RAT and/or radio resource, the base station 104 proceeds to determine 528 whether that RAT and/or radio resource is currently available. Event 528 may be similar to event 428 of FIG. 4, for example.

After determining 528 availability of the other RAT and/or radio resource, the base station 104 transmits 529 a MsgB to the UE 102. The MsgB may be similar to the MsgB of a conventional two-step, contention-based RACH procedure, but is modified to include an indication of the availability as determined 528 by the base station 104. For example, the MsgB may include an additional field (e.g., a single bit) that indicates availability of the RAT and/or radio resource. In some implementations, the MsgB can indicate availability of the other RAT and/or radio resource in a non-binary manner, as discussed above in connection with the Msg2 of FIG. 4 (e.g., with an "unavailable," "temporarily unavailable," or "available" status, or another suitable set of potential statuses).

As noted above, the RACH procedure that the UE 102 initiates to check RAT and/or radio resource availability may or may not be a full RACH procedure (i.e., may or may not have the potential to result in channel access and/or transition the UE 102 to a connected state). In implementations where the UE 102 does not use the dedicated RACH procedure to make a channel access attempt, the base station 104 may generate and transmit 529 the MsgB without performing other operations typically associated with contention-based RACH procedures (e.g., HARQ procedures). In other implementations, however, the UE 102 and base station 104 may perform a full two-step, contention-based RACH procedure, possibly leading to channel access and/or causing the UE 102 to enter a connected state with respect to the cell 124 and the base station 104.

Figure 6:
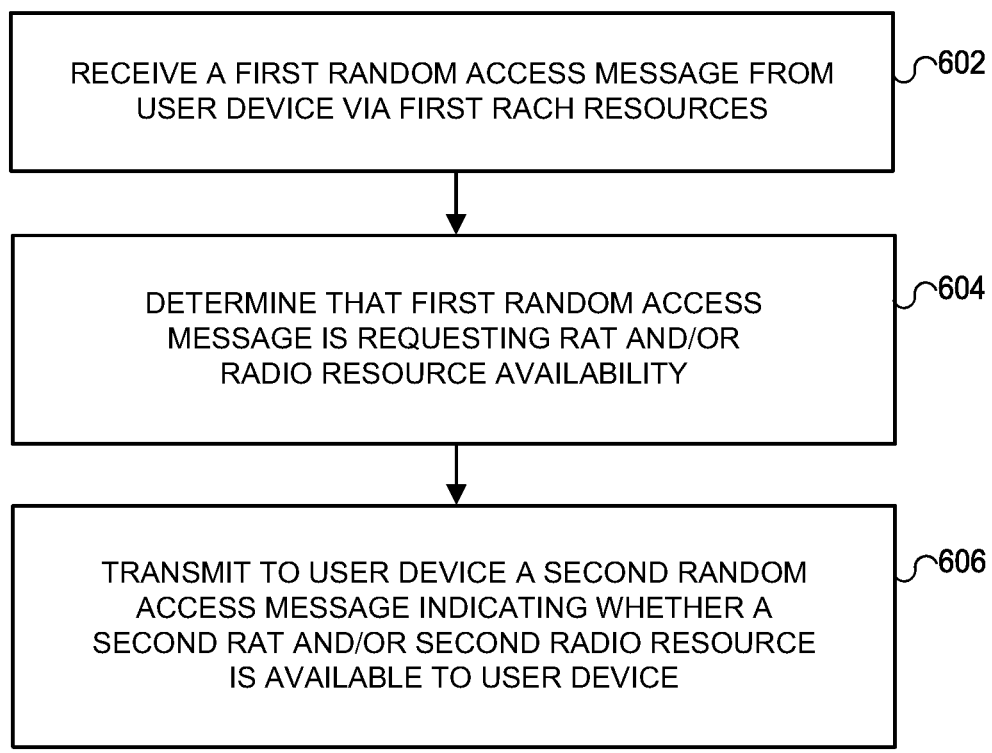
FIG. 6 is a flow diagram of an example method for informing a user device of alternative RAT and/or radio resource availability, which can be implemented in a base station.

FIG. 6 is a flow diagram of an example method 600 for informing a user device (e.g., UE 102) of alternative RAT and/or radio resource availability, which can be implemented in a base station configured to communicate with user devices using a first RAT (e.g., 4G LTE, 5G NR, etc.) and/or a first radio resource (e.g., a particular channel or frequency band, or a particular time slot, etc.). For example, the method 600 may be implemented in the base station 104, in whole or in part by processing hardware 130.

At block 602, the base station receives a first random access message from the user device via first RACH resources. For example, the first random access message may be the Msg1 transmitted at event 422 or the MsgA transmitted at event 521. Block 602 may occur while the user device is in an idle or inactive state relative to the first RAT (e.g., camped on cell 124), for example.

At block 604, the base station determines that the first random access message received at block 602 (and therefore the user device) is requesting RAT and/or radio frequency availability. Block 604 may include the base station determining that the user device transmitted the first random access message using the first RACH resources (e.g., a specific time and/or frequency, such as a specific PRACH occasion, and/or a specific preamble sequence). In some implementations, block 604 includes the base station determining that the first random access message is requesting availability specifically of a second RAT and/or second radio resource (i.e., a particular RAT and/or radio resource different from the first RAT and/or different than the first radio resource) by inspecting information in the first random access message (e.g., a field or information element in the MsgA transmitted at event 525, specifying the availability in a binary or non-binary manner as discussed above in connection with FIGS. 4 and 5). In other implementations, block 604 does not include this determination, and the base station instead identifies the second RAT and/or second radio frequency by determining that the first RACH resources are specifically associated with the second RAT and/or second radio frequency. The determining at block 604 may be similar to event 426 or event 526, for example.

At block 606, the base station transmits to the user device a second random access message indicating whether the second RAT and/or second radio resource is/are available to the user device. For example, the second random access message may be the Msg2 transmitted at event 430 or the MsgB transmitted at event 529.

In some implementations, the method 600 includes one or more additional blocks not shown in FIG. 6. For example, the method 600 may include an additional block, before block 602, in which the base station configures (e.g., event 310) the user device to use the first RACH resources for requesting RAT and/or radio resource availability. In some implementations, the base station configures the user device for requesting availability specifically of the second RAT and/or second radio resource, and also configures the user device to use other specific RACH resources for requesting availability of other RATs and/or radio resources.

As another example, the method 600 may include an additional block, after block 604, in which the base station determines whether the second RAT and/or second radio resource is available to the user device (e.g., event 428 or 528). This determination may include estimating the coarse location of the user device and comparing that estimated location to a known coverage area of the second RAT and/or second radio resource, and/or receiving (e.g., from base station 106) an indicator of current capacity of the second RAT and/or second radio resource (e.g., as discussed above in connection with event 428 of FIG. 4).

As another example, the method 600 may include additional blocks, after block 606, in which the base station connects to the user device, and configures the user device to make one or more measurements (e.g., signal and/or channel quality measurements) with respect to the second RAT and/or second radio resource. Additionally or alternatively, after the connection, the base station may initiate dual connectivity (DC) for the user device with the base station and another base station associated with the second RAT and/or second radio resource (if the second RAT is different from the first RAT), or may initiate carrier aggregation for the user device with a first channel of the base station and a second channel of another base station associated with the second radio resource (if the second radio resource is a different frequency and the second RAT is the same as the first RAT). The other base station may be base station 106, for example.

Figure 7:
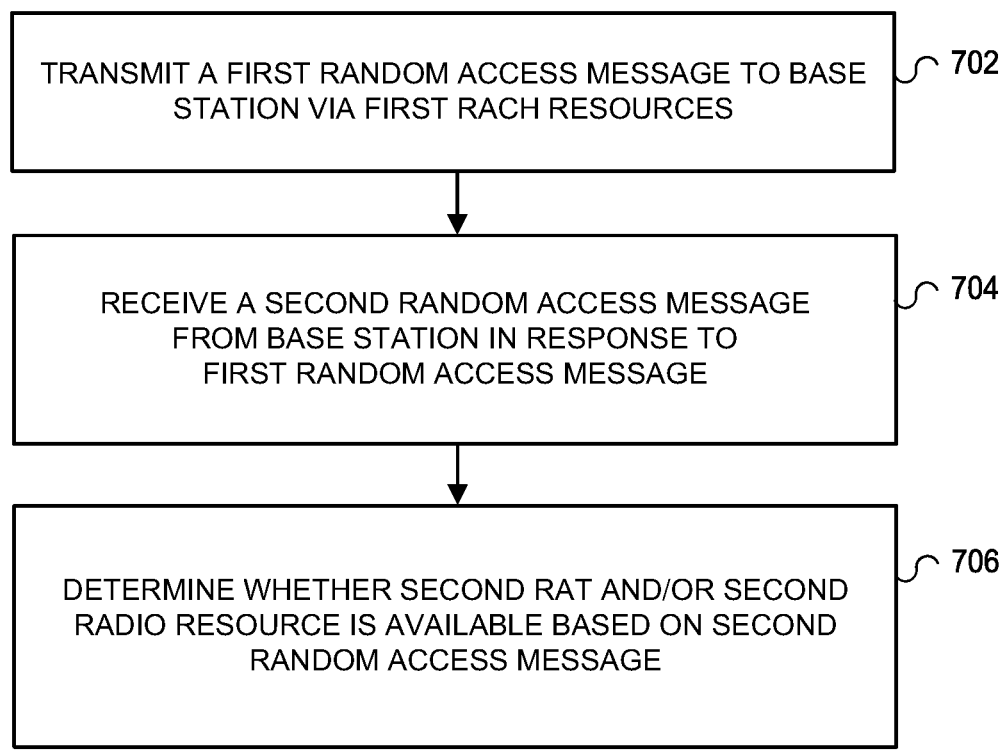
FIG. 7 is a flow diagram of an example method for checking alternative RAT and/or radio resource availability, which can be implemented in a user device.

FIG. 7 is a flow diagram of an example method 700 for checking alternative RAT and/or radio resource availability, which can be implemented in a user device configured to communicate with a base station using a first RAT (e.g., 4G LTE, 5G NR, etc.) and/or a first radio resource (e.g., a particular channel or frequency band, or a particular time slot, etc.). For example, the method 700 may be implemented in the UE 102, in whole or in part by processing hardware 140.

At block 702, the user device transmits a first random access message to a base station (e.g., base station 104) via first RACH resources (e.g., a specific time and/or frequency, such as a specific PRACH occasion, and/or a specific preamble sequence). For example, the first random access message may be the Msg1 transmitted at event 422 or the MsgA transmitted at event 521. Block 702 may occur while the user device is in an idle or inactive state relative to the first RAT (e.g., camped on cell 124), for example.

At block 704, in response to the first random access message transmitted at block 702, the user device receives a second random access message from the base station. For example, the second random access message may be the Msg2 transmitted at event 430 or the MsgB transmitted at event 529.

At block 706, the user device determines whether a second RAT and/or second radio resource (different from the first RAT and/or different from the first radio resource) is available based on the second random access message received at block 704. For example, block 706 may include the user device inspecting a field or information element in the second random access message that specifies the availability (e.g., in a binary or non-binary manner, as discussed above in connection with FIGS. 4 and 5).

In some implementations, the method 700 includes one or more additional blocks not shown in FIG. 7. For example, the method 700 may include an additional block, before block 702, in which the user device receives from the base station a message configuring the user device to use the first RACH resources for requesting RAT and/or radio resource availability. In some implementations, the message configures the user device to use the first RACH resources for requesting availability specifically of the second RAT and/or second radio resource, and the message (or other messages from the base station) also configures the user device to use other specific RACH resources for requesting availability of other RATs and/or radio resources.

As another example, the method 700 may include additional blocks, after block 704, in which the user device connects to the base station, and receives from the base station a message configuring the user device to make one or more measurements (e.g., signal and/or channel quality measurements) with respect to the second RAT and/or second radio resource. Additionally or alternatively, after the measurements, the user device may begin DC communication with the base station and another base station associated with the second RAT and/or second radio resource (if the second RAT is different from the first RAT), or may be provided carrier aggregation via a first channel of the base station and a second channel of another base station associated with the second radio resource (if the second radio resource is a different frequency and the second RAT is the same as the first RAT). The other base station may be base station 106, for example.

The following list of examples reflects a variety of the embodiments explicitly contemplated by the present disclosure:

Example 1

A method in a base station configured to communicate with a user device using a first radio access technology, RAT, and/or a first radio resource, the method comprising: receiving a first random access message from the user device via first random access channel, RACH, resources; determining, by processing hardware of the base station, that the first random access message is requesting RAT and/or radio resource availability; and transmitting to the user device a second random access message indicating whether a second RAT and/or a second radio resource is available to the user device.

Example 2

The method of example 1, wherein determining that the first random access message is requesting RAT and/or radio resource availability includes: determining that the user device transmitted the first random access message using the first RACH resources.

Example 3

The method of example 1 or 2, wherein determining that the first random access message is requesting RAT and/or radio resource availability includes: determining that the first random access message is requesting availability specifically of the second RAT and/or the second radio resource.

Example 4

The method of example 3, wherein determining that the first random access message is requesting availability specifically of the second RAT and/or the second radio resource is based on information in the first random access message indicating the second RAT and/or the second radio resource.

Example 5

The method of any one of examples 1 through 4, further comprising: after determining that the first random access message is requesting RAT and/or radio resource availability, determining, by the processing hardware, whether the second RAT and/or the second radio resource is available to the user device.

Example 6

The method of example 5, wherein determining whether the second RAT and/or the second radio resource is available to the user device includes determining whether the second RAT is available to the user device.

Example 7

The method of example 5, wherein determining whether the second RAT and/or the second radio resource is available to the user device includes determining whether the second radio resource is available to the user device.

Example 8

The method of example 7, wherein determining whether the second radio resource is available to the user device includes determining whether a particular frequency band is available to the user device.

Example 9

The method of any one of examples 5 through 8, wherein determining whether the second RAT and/or the second radio resource is available to the user device includes determining whether the user device is currently in a location covered by the second RAT and/or the second radio resource.

Example 10

The method of example 9, wherein determining whether the user device is currently in a location covered by the second RAT and/or the second radio resource includes: determining a coarse location of the user device by processing a received signal carrying the first random access message; and comparing the coarse location to a known coverage area of the second RAT and/or the second radio resource.

Example 11

The method of any one of examples 5 through 10, wherein determining whether the second RAT and/or the second radio resource is available to the user device includes receiving an indicator of current capacity of the second RAT and/or the second radio resource.

Example 12

The method of example 11, wherein transmitting to the user device the second random access message includes: selecting an availability status, from among three or more potential availability statuses, based on the indicator of current capacity of the second RAT and/or the second radio resource; and including the selected availability status in the second random access message.

Example 13

The method of any one of examples 1 through 12, wherein the first RACH resources include one or more of: a specific frequency; a specific time; or a specific preamble sequence.

Example 14

The method of any one of examples 1 through 13, wherein receiving the first random access message includes: receiving the first random access message from the user device while the user device is in an idle state or an inactive state relative to the first RAT.

Example 15

The method of example 14, further comprising, after transmitting the second random access message: connecting to the user device; and configuring the user device to make one or more measurements with respect to the second RAT and/or the second radio resource.

Example 16

The method of any one of examples 1 through 14, further comprising, after transmitting the second random access message: connecting to the user device; and initiating dual connectivity for the user device with the base station and another base station.

Example 17

The method of any one of examples 1 through 14, further comprising, after transmitting the second random access message: connecting to the user device; and initiating carrier aggregation for the user device with a first channel of the base station and a second channel of another base station.

Example 18

The method of any one of examples 1 through 17, wherein: the first random access message is a Msg1 of a four-step contention-based RACH procedure; and the second random access message is a modified Msg2 of the four-step contention-based RACH procedure, the modified Msg2 including one or more fields indicating whether the second RAT and/or the second radio resource is available to the user device.

Example 19

The method of any one of examples 1 through 17, wherein: the first random access message is a MsgA of a two-step contention-based RACH procedure; and the second random access message is a modified MsgB of the two-step contention-based RACH procedure, the modified MsgB including one or more fields indicating whether the second RAT and/or the second radio resource is available to the user device.

Example 20

The method of any one of examples 1 through 19, further comprising: before receiving the first random access message, configuring the user device to use the first RACH resources for requesting RAT and/or radio resource availability.

Example 21

The method of example 20, wherein configuring the user device to use the first RACH resources for requesting RAT and/or radio resource availability includes: configuring the user device to use the first RACH resources for requesting availability specifically of the second RAT and/or the second radio resource.

Example 22

The method of example 21, further comprising: configuring the user device to use second RACH resources for requesting availability specifically of a third RAT and/or a third radio resource.

Example 23

The method of any one of examples 20 through 22, wherein configuring the user device to use the first RACH resources includes: transmitting a system information block, SIB, specifying at least a portion of the first RACH resources to the user device; or transmitting a radio resource control, RRC, message specifying at least a portion of the first RACH resources to the user device.

Example 24

The method of example 23, wherein configuring the user device to use the first RACH resources includes: transmitting to the user device an RRC message that causes the user device to enter an idle or inactive state.

Example 25

A base station comprising hardware and configured to implement the method of any one of examples 1 through 24.

Example 26

A method in a user device configured to communicate with a base station using a first radio access technology, RAT, and/or a first radio resource, the method comprising: transmitting a first random access message to the base station via first random access channel, RACH, resources; receiving a second random access message from the base station in response to the first random access message; and determining, by processing hardware of the user device, whether a second RAT and/or a second radio resource is available based on the second random access message.

Example 27

The method of example 26, wherein the first random access message specifies the second RAT and/or the second radio resource.

Example 28

The method of examples 26 or 27, wherein: the second random access message includes an availability status selected by the base station from among three or more potential availability statuses.

Example 29

The method of any one of examples 26 through 28, wherein the first RACH resources include one or more of: a specific frequency; a specific time; or a specific preamble sequence.

Example 30

The method of any one of examples 26 through 29, wherein transmitting the first random access message includes: transmitting the first random access message to the base station while the user device is in an idle state or an inactive state relative to the first RAT.

Example 31

The method of any one of examples 26 through 30, further comprising, after receiving the second random access message: connecting to the base station; and receiving from the base station a message configuring the user device to make one or more measurements with respect to the second RAT and/or the second radio resource.

Example 32

The method of any one of examples 26 through 31, wherein: the first random access message is a Msg1 of a four-step contention-based RACH procedure; and the second random access message is a modified Msg2 of the four-step contention-based RACH procedure, the modified Msg2 including one or more fields indicating whether the second RAT and/or the second radio resource is available to the user device.

Example 33

The method of any one of examples 26 through 31, wherein: the first random access message is a MsgA of a two-step contention-based RACH procedure; and the second random access message is a modified MsgB of the two-step contention-based RACH procedure, the modified MsgB including one or more fields indicating whether the second RAT and/or the second radio resource is available to the user device.

Example 34

The method of any one of examples 26 through 33, further comprising: before transmitting the first random access message, receiving from the base station a message configuring the user device to use the first RACH resources for requesting RAT and/or radio resource availability.

Example 35

The method of example 34, wherein the message configuring the user device to use the first RACH resources is a message configuring the user device to use the first RACH resources for requesting availability specifically of the second RAT and/or the second radio resource.

Example 36

The method of example 35, further comprising: receiving from the base station a message configuring the user device to use second RACH resources for requesting availability specifically of a third RAT and/or a third radio resource.

Example 37

The method of any one of examples 34 through 36, wherein receiving the message includes: receiving a system information block, SIB, specifying at least a portion of the first RACH resources; or receiving a radio resource control, RRC, message specifying at least a portion of the first RACH resources.

Example 38

The method of example 37, wherein receiving the message includes: receiving an RRC message that causes the user device to enter an idle or inactive state.

Example 39

A user device comprising hardware and configured to implement the method of any one of examples 26 through 38.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for providing information regarding the availability of alternative RATs and/or radio resources through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method of wireless communication at a base station, the method comprising:
    receiving a first random access message from a user equipment (UE) via a first random access channel (RACH) resources, using a first radio access technology (RAT);
    determining that the first random access message is requesting an indication about availability of a second RAT or a second radio resource;
    determining that at least one of the second RAT or the second radio resource is available to the UE; and
    transmitting, to the UE, a second random access message indicating that the at least one of the second RAT or the second radio resource is available to the UE.

2. The method of claim 1, further comprising:
    selecting an availability status from among three or more potential availability statuses and including the selected availability status in the second random access message.

3. The method of claim 1, further comprising: determining that the second RAT is available to the UE.

4. The method of claim 1, further comprising determining that the second radio resource is available to the UE.

5. The method of claim 1, wherein the determining includes identifying the at least one of the second RAT or the second radio resource based on information included in the first random access message.

6. The method of claim 4, further comprising: determining that the UE is currently in a location covered by the identified at least one of the second RAT or the second radio resource.

7. The method of claim 6, wherein the determining that the UE is currently in the location covered by the at least one of the second RAT or the second radio resource comprises:
    determining a coarse location of the UE by processing a received signal carrying the first random access message; and
    comparing the coarse location and a known coverage area of the at least one of the second RAT or the second radio resource.

8. The method of claim 7, wherein the determining of the coarse location of the UE comprises:
    calculating a distance between the base station and the UE based on a timing of the received signal;
    estimating a direction from which the received signal arrived; and
    offsetting a location of the base station by the distance and in the direction.

9. The method of claim 1, wherein the first RACH resources comprise one or more of:
   a specific frequency;
   a specific time; or
   a specific preamble sequence.

10. The method of claim 1, further comprising:
   before the receiving of the first random access message, configuring the UE to use the first RACH resources for transmitting the first random access message requesting the indication about availability of the at least one of the second RAT or the second radio resource.

11. The method of claim 10, wherein the configuring of the UE comprises:
   identifying the at least one of the second RAT or the second radio resource for which the first random access message requests the indication.

12. The method of claim 1, further comprising:
   scheduling the UE to perform channel quality measurements for a cell to enable the UE to connect to the base station via the cell within a predetermined window of time.

13. A method of wireless communication at a user equipment (UE) the method comprising:
   transmitting, to a base station, a first random access message via first random access channel (RACH) resources using a first radio access technology (RAT), the first random access message requesting an availability status of at least one of a second RAT or a second radio resource;
   in response to the first random access message, receiving, from the base station, a second random access message including the availability status indicating that the at least one of the second RAT or the second radio resource is available to the UE; and
   determining whether one of the second RAT and the second radio resource is available based on the availability status included in the second random access message.

14. The method of claim 13, wherein the first random access message identifies the at least one of the second RAT or the second radio resource.

15. The method of claim 13, wherein:
   the availability status included in the second random access message is one of three or more potential availability statuses.

16. The method of claim 13, wherein the first RACH resources comprise one or more of:
   a specific frequency;
   a specific time; or
   a specific preamble sequence.

17. The method of claim 13, further comprising:
   before transmitting the first random access message, receiving from the base station a message configuring the UE to use the first RACH resources.

18. The method of claim 17, wherein the first random message identifies the at least one of the second RAT or the second radio resource.

19. An apparatus for wireless communication at a user equipment (UE), comprising:
   a transceiver;
   a memory; and
   a processor coupled to the memory and the transceiver, the processor configured to:
   transmit, to a base station, a first random access message via first random access channel (RACH) resources using a first radio access technology (RAT), the first random access message requesting an availability status of at least one of a second RAT or a second radio resource;
   in response to the first random access message, receive, from the base station, a second random access message including the availability status indicating that the at least one of the second RAT or the second radio resource is available to the UE; and
   determine whether one of the second RAT and the second radio resource is available based on the availability status included in the second random access message.

20. The apparatus of claim 19, wherein the first random access message identifies the at least one of the second RAT or the second radio resource.

* * * * *